No. 741,487. PATENTED OCT. 13, 1903.
H. HAILEY.
HARROW.
APPLICATION FILED SEPT. 19, 1902.
NO MODEL.
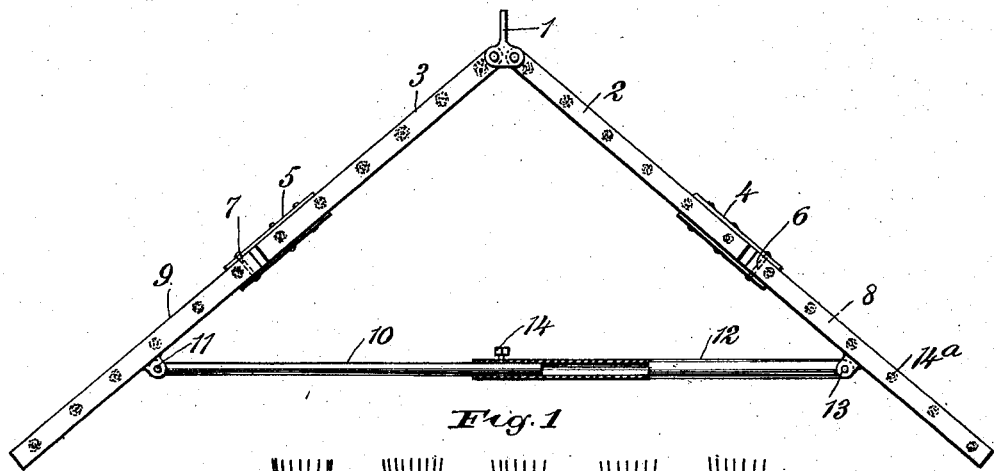
Fig. 1
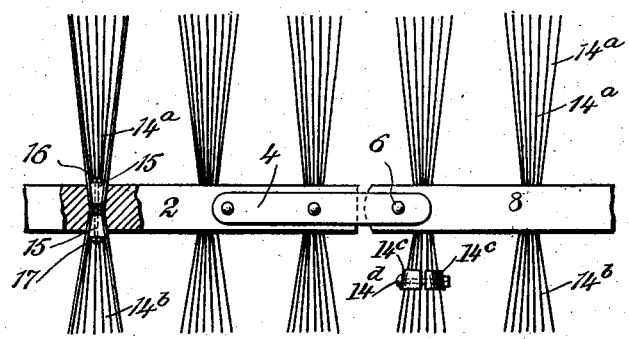
Fig. 2
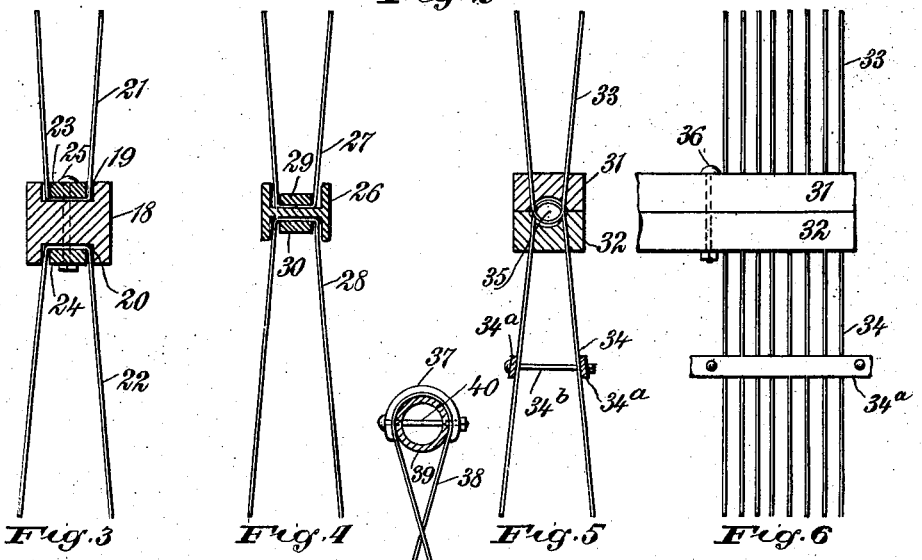
Fig. 3    Fig. 4    Fig. 5    Fig. 6
Fig. 7
WITNESSES:
Joshua Bergstrom
Walton Harrison
INVENTOR
Herbert Hailey
BY
ATTORNEYS.

No. 741,487.

Patented October 13, 1903.

UNITED STATES PATENT OFFICE.

HERBERT HAILEY, OF GREAT WYMONDLEY, ENGLAND.

HARROW.

SPECIFICATION forming part of Letters Patent No. 741,487, dated October 13, 1903.

Application filed September 19, 1902. Serial No. 124,005. (No model.)

*To all whom it may concern:*

Be it known that I, HERBERT HAILEY, a subject of the King of Great Britain, and a resident of Great Wymondley, near Hitchin, in the county of Herts, England, have invented a new and Improved Harrow, of which the following is a full, clear, and exact description.

My invention relates to harrows, my object more particularly being to produce a harrow which is flexible relatively to the ground and provided with brush-teeth of different lengths and with adjustments for governing the relative positions of different parts of the framework of the machine.

Reference is to be had to the accompanying drawings, forming a part of this specification, in which similar characters of reference indicate corresponding parts in all the figures.

Figure 1 is a plan view of my harrow, partly broken away and in section. Fig. 2 is an enlarged fragmentary elevation, showing parts of the framework and also showing the brush-teeth. Figs. 3, 4, 5, and 7 are enlarged sections of modified forms of the frame, showing modified forms of brushes connected therewith; and Fig. 6 is a fragmentary elevation of the construction shown in Fig. 5.

Pivoted upon the clevis 1 are the longitudinal beams 2 3. The outer or free ends of these beams are provided with plates 4 5, connected together by pivots 6 7, upon which the longitudinal beams 8 9 are journaled, as indicated in Fig. 1. A rod 10 and tube 12 are pivoted, respectively, upon the bearings 11 and 13 and are connected telescopically together. By means of the set-screw 14 the rod and tube are adjustable relatively to each other for the purpose of governing the relative position occupied by the members 2 and 8, constituting one member of the frame, and the longitudinal beams 3 and 9, constituting another member thereof. The beams 3 and 9 are flexible relatively to each other, so as to form two variations in the level of the ground over which the harrow is dragged. Similarly the beams 2 and 8 are flexible relatively to each other, the pivot 6 acting as a bearing.

The harrow instead of being fitted with ordinary teeth is provided with bunches of brushes 14$^a$ 14$^b$, composed, preferably, of longitudinal sections of spring-wire, the parts 14$^a$ being longer than the parts 14$^b$. By means of removable plugs 15 of conical form, held together by means of bolts 16 and nuts 17, the brushes are secured in position. By removing the nuts 17 the bolts, plugs, and wires may be removed.

In Fig. 3 is shown a modification in the form of beam used. The beam 18 has the shape indicated in cross-section in Fig. 3, being provided with longitudinal channels 19 and 20. The wires are bent into U form, as shown at 21 22, and are held in place by means of longitudinal strips 23 24, these strips being secured together by bolts 25. If desired, the beam may have the cross-sectional form indicated at 26 in Fig. 4, the U-shaped wires 27 28 being held in position by means of metallic strips 29 30.

If desired, the beams may be of composite structure, made of two parts 31 32, the wires 33 34 being of hair-pin shape, as indicated in Fig. 5, the bends in the wire being placed within a cavity 35 between the parts 31 and 32, the latter being held together by means of bolts 36. If desired, the beams may each have the form of a tube 39, surmounted by a saddle 37 and pierced by bolts 40, as indicated in Fig. 7. In this case the brushes 38 are substantially of hair-pin shape, with the points crossed, as indicated in Fig. 7.

The brushes are adjustable by means of collars made in substantially semicylindrical halves 14$^c$, held together by bolts 14$^d$ or by plates 34$^a$, held together by bolts 14$^b$. The bolts are loosened, the adjusting members elevated or lowered to the desired point, and the bolts tightened. By this means any desired degree of flare may be given to the brushes.

When the brushes are arranged as indicated in Figs. 5, 6, and 7, each wire constitutes a distinct brush, there being only two wires in a bunch.

The arrangement of the bunches of wire is such that when the frame is turned upon one side the ground is engaged by brushes of one length—say 14$^b$ (shown in Fig. 2)—and when the frame is turned over the ground is engaged by brushes of a different length—say 14$^a$ in the same figure. In other words, by turning the implement upside down a stiffer set of wires will be presented to the soil.

The beams 2, 8, 3, and 9 are preferably made interchangeable and so arranged that the curvature given to the wires by use may be corrected by so disposing the wires that the strain will be in a different direction, thus bending the wires back into their normal positions—that is to say, any distortion in the shape of a brush may be corrected by bending the brush in the opposite direction while the harrow is in use.

Having thus described my invention, I claim as new and desire to secure by Letters Patent—

1. A harrow comprising a composite frame built up of separate beams flexibly connected together and free to move relatively to each other, and a plurality of brushes made of spring-wires and of two different lengths, the brushes of one length being free to engage the ground when said frame occupies a certain predetermined position relative to the ground, and the brushes of the other length being free to engage the ground when said frame occupies another position relative to the ground.

2. A harrow comprising a composite frame built up of separate members flexibly connected together and free to move relatively to each other, means controllable at will for adjusting said members relatively to each other, a plurality of brushes made of spring-wires and of two different lengths, the brushes of one length being free to engage the ground when said frame occupies a certain predetermined position relative to the ground, and the brushes of the other length being free to engage the ground when said frame occupies another position relative to the ground.

3. A harrow comprising a composite frame built up of longitudinal beams pivotally connected together and arranged substantially in a V shape, a clevis pivotally connected with the terminal beams, a telescopic adjustment for governing the relative position of said beams, and a plurality of brushes of spring-wire detachably secured to said beams.

4. In a harrow, a frame made of members provided with spring-wire teeth, divers of said teeth immediately adjacent to each other being so disposed as to normally flare asunder, and two-part clamping mechanism adjustably mounted upon said teeth and provided with bolts for drawing said teeth toward each other.

In testimony whereof I have signed my name to this specification in the presence of two subscribing witnesses.

HERBERT HAILEY.

Witnesses:
RICHARD WESTACOTT,
FRANCIS W. FRIGOUT.